United States Patent
Cherkauer et al.

(10) Patent No.: US 7,529,783 B2
(45) Date of Patent: May 5, 2009

(54) LOG SHIPPING DATA REPLICATION WITH PARALLEL LOG WRITING AND LOG SHIPPING AT THE PRIMARY SITE

(75) Inventors: Kevin J. Cherkauer, Portland, OR (US); Scott D. Lashley, Portland, OR (US); Dale M. McInnis, Aurora (CA); Effi Ofer, Thornhill (CA); Steven R. Pearson, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 782 days.

(21) Appl. No.: 11/021,002

(22) Filed: Dec. 22, 2004

(65) Prior Publication Data

US 2006/0136686 A1  Jun. 22, 2006

(51) Int. Cl.
*G06F 17/30* (2006.01)
(52) U.S. Cl. ...................... 707/204; 707/202
(58) Field of Classification Search ................. 707/200, 707/204
See application file for complete search history.

(56) References Cited

U.S. PATENT DOCUMENTS

| | | | |
|---|---|---|---|
| 5,379,412 A | 1/1995 | Eastridge et al. | |
| 5,594,900 A | 1/1997 | Cohn et al. | |
| 5,857,190 A | 1/1999 | Brown | |
| 6,014,674 A * | 1/2000 | McCargar | 707/202 |
| 6,125,407 A * | 9/2000 | Abily et al. | 710/7 |
| 6,163,856 A * | 12/2000 | Dion et al. | 714/4 |
| 6,226,651 B1 | 5/2001 | Masuda et al. | |
| 6,247,023 B1 | 6/2001 | Hsiao et al. | |
| 6,523,036 B1 | 2/2003 | Hickman et al. | |
| 6,978,279 B1 * | 12/2005 | Lomet et al. | 707/202 |
| 7,128,270 B2 * | 10/2006 | Silverbrook et al. | 235/472.01 |
| 7,188,273 B2 * | 3/2007 | Allen et al. | 714/6 |
| 2002/0103816 A1 | 8/2002 | Ganesh et al. | |
| 2002/0169889 A1 * | 11/2002 | Yang et al. | 709/244 |
| 2003/0061537 A1 * | 3/2003 | Cha et al. | 714/16 |
| 2003/0225760 A1 * | 12/2003 | Ruuth et al. | 707/5 |
| 2004/0098425 A1 * | 5/2004 | Wiss et al. | 707/204 |
| 2004/0158588 A1 * | 8/2004 | Pruet, III | 707/204 |
| 2004/0190092 A1 * | 9/2004 | Silverbrook et al. | 358/539 |
| 2005/0055445 A1 * | 3/2005 | Gupta et al. | 709/226 |
| 2005/0071336 A1 * | 3/2005 | Najork et al. | 707/8 |
| 2005/0071389 A1 * | 3/2005 | Gupta | 707/204 |
| 2005/0071391 A1 * | 3/2005 | Fuerderer et al. | 707/204 |
| 2005/0138461 A1 * | 6/2005 | Allen et al. | 714/4 |

\* cited by examiner

*Primary Examiner*—Hung Q Pham
*Assistant Examiner*—Linh Black
(74) *Attorney, Agent, or Firm*—Kunzler & McKenzie

(57) ABSTRACT

A log-shipping data replication system employs a primary server coupled to a standby server. In operation, the primary server concurrently flushes log data at the primary server and transmits the same log data from the primary server to the standby server. The primary server further transmits at least one buffer flush boundary indication to the standby server indicating the flushing status of the log data at the primary server. The standby server processes the log data as a function of receiving the log data from the primary server, and/or receiving the at least one buffer flush boundary indication from the primary server.

9 Claims, 17 Drawing Sheets

LOG SHIPPING DATA REPLICATION WITH PARALLEL LOG WRITING AND LOG SHIPPING AT THE PRIMARY SITE

FIELD OF INVENTION

The present invention generally relates to log-shipping data replication between a primary site and a standby site. The present invention specifically relates to parallel log writing and log shipping at the primary site.

BACKGROUND OF THE INVENTION

Log-shipping data replication is a common technique used by database systems to increase availability of the respective database to applications. A primary instance of a database transfers copies of its log records to a standby instance of the database, where the logged operations are replayed in a fashion similar to that of ordinary database recovery operations (e.g., crash recovery or rollforward recovery). The standby instance of the database is typically unavailable for update during normal operation, but can take over as a new primary instance of the database in case of a failure of the original primary instance of the database. The database is generally available as long as either site is functioning properly, providing protection against a single point of failure.

Two important measures of the usefulness of log-shipping data replication are transactional consistency and the performance impact on the primary instance of the database. Transactional consistency concerns the degree of guarantees the system provides that transactions performed at the primary instance of the database are neither lost nor completed with different outcomes at each standby instance of the database, both during normal operation and in case of the failure of either database instance. The performance impact on the primary instance of the database concerns the degree to which the normal processing of the primary instance of the database is slowed down in order to accomplish the log shipping data replication activity. These two characteristics can be tuned by configuration choices and other factors, and in some cases, the choices trade off one against the other. A challenge therefore for the computer industry is to optimize both characteristics to the greatest extent possible.

SUMMARY OF THE INVENTION

The present invention provides a new and unique log-shipping data replication with parallel log writing and log shipping at a primary site.

A first embodiment of the present invention is a log-shipping data replication method comprising: concurrently flushing of a first log data at a primary server and transmitting the first log data from the primary server to a standby server coupled to the primary server; transmitting at least one buffer flush boundary indication to the standby server, the at least one buffer flush boundary indication indicating a flushing status of the first log data at the primary server; and processing the first log data at the standby server as a function of at least one of the standby server receiving the first log data and the standby server receiving the at least one buffer flush boundary indication.

A second embodiment of the present invention is a log-shipping data replication system employing a primary server coupled to a standby server. The primary server stores a first set of executable instructions for concurrently flushing a first log data at the primary server and transmitting the first log data from the primary server to the standby server, and transmitting at least one buffer flush boundary indication to the standby server, the at least one buffer flush boundary indication indicating a flushing status of the first log data at the primary server. The standby server stores a second set of executable instructions for processing the first log data at the standby server as a function of at least one of the standby server receiving the first log data and the standby server receiving the at least one buffer flush boundary indication.

A third embodiment of the present invention is a log-shipping data replication system employing a primary server connected to a standby server. The primary server includes means for concurrently flushing a first log data at the primary server and transmitting the first log data from the primary server to the standby server, and means for transmitting at least one buffer flush boundary indication to the standby server, the at least one buffer flush boundary indication indicating a flushing status of the first log data at the primary server. The standby server includes means for processing the first log data at the standby server as a function of at least one of the standby server receiving the first log data and the standby server receiving the at least one buffer flush boundary indication.

The forgoing embodiments and other embodiments, objects, and aspects as well as features and advantages of the present invention will become further apparent from the following detailed description of various embodiments of the present invention. The detailed description and drawings are merely illustrative of the present invention, rather than limiting the scope of the present invention being defined by the appended claims and equivalents thereof.

DETAILED DESCRIPTION OF THE PRESENT INVENTION

Figure 1:
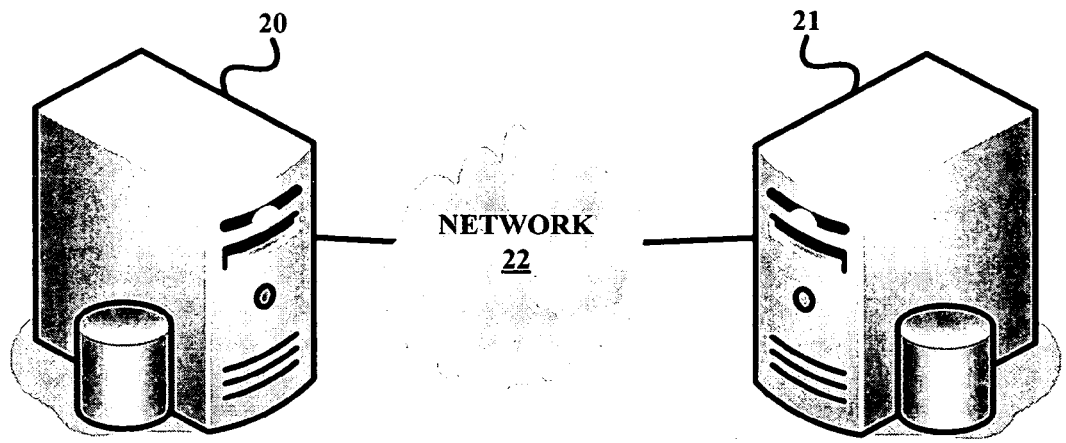
FIG. 1 illustrates a first embodiment of a log shipping data replication system in accordance with the present invention.
Figure 2:
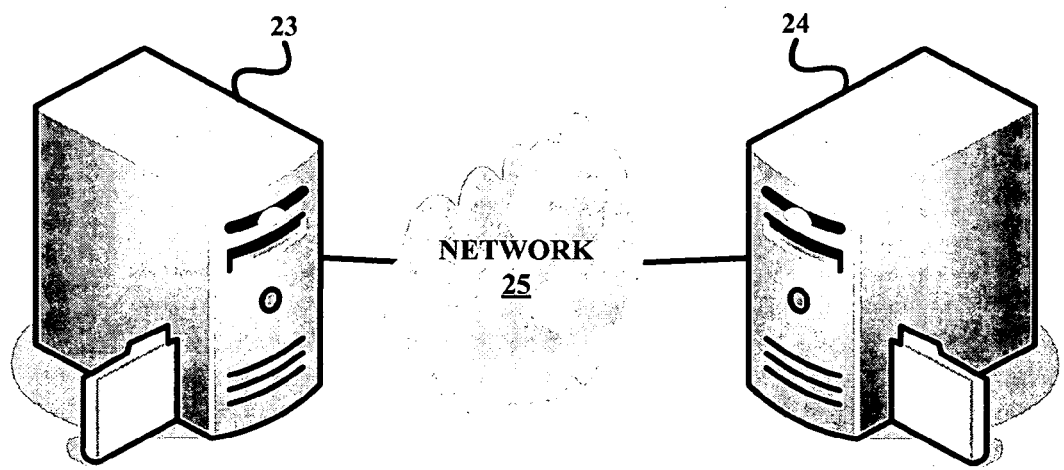
FIG. 2 illustrates a second embodiment of a log shipping data replication system in accordance with the present invention.

FIGS. 1 and 2 illustrate two (2) exemplary log-shipping data replication systems of the present invention for practicing a log-shipping data replication method of the present invention. The system of FIG. 1 employs a primary database server 20 and a standby database server 21 connected via a network 22 for implementing a flowchart 30 (FIG. 3) that is representative of the log-shipping data replication method of the present invention. The system of FIG. 2 employs a primary file server 23 and a standby file server 24 connected via a network 25 for implementing flowchart 30. Networks 22 and 25 represent any type of connection between two servers ranging from a simple cable connection or wireless connection to a highly complex interconnection.

For purposes of the present invention, the term "connected" is broadly defined herein to encompass any technique for facilitating a communication of electrical signals (e.g., data and messages) between a primary server and a standby-server, such as, for example, a direct wireline connection, a direct wireless connection and a coupling via a network (wireline and/or wireless).

Figure 3:
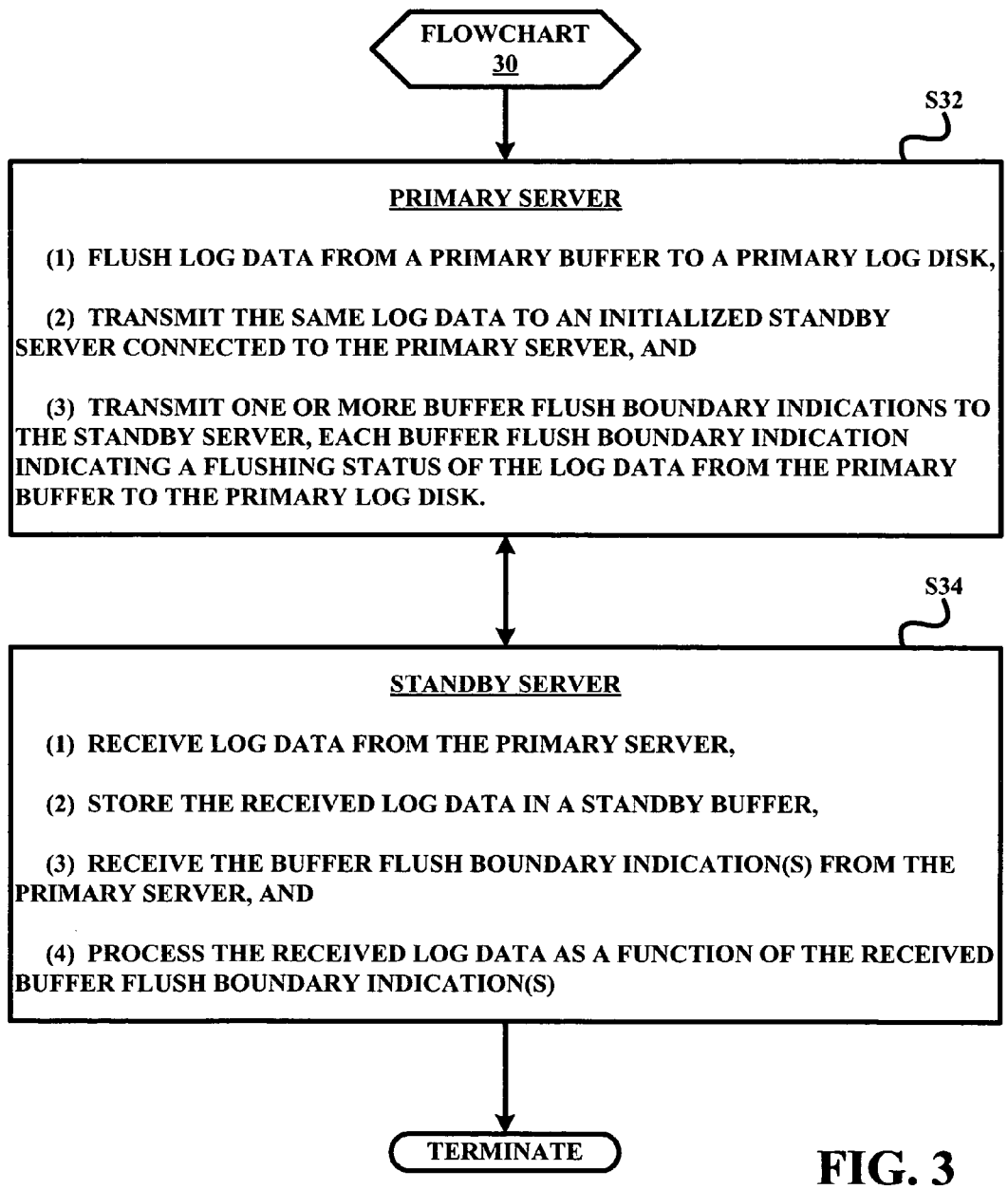
FIG. 3 illustrates a flowchart representative of a log shipping data replication method in accordance with the present invention.

Referring to FIGS. 1-3, a stage S32 of flowchart 30 encompasses a primary server flushing log data from a primary buffer to a primary log disk, and transmitting the same log data to an initialized standby server. These first two tasks are performed by the primary server in parallel, although a launching of the log data flushing task and a launching of the log data transmission task may or may not occur simultaneously, and a completion of the log data flushing task and a completion of the log data transmission task may or may not occur simultaneously.

In view of attaining an optimal transactional consistency with a minimal burden on the primary server, stage S32 further encompasses the primary server transmitting one or more buffer flush boundary indications where each buffer flush boundary indication indicates a flushing status of the log data from the primary buffer to the primary log disk. In one embodiment, a buffer flush boundary indication is embedded in the transmission of the log data from the primary server to the standby server, such as, for example, a setting of a bit in a header within the log data. In a second embodiment, a buffer flush boundary indication is included within the transmission of the log data from the primary server to the standby server as a separate and distinct entity. In a third embodiment, a buffer flush boundary indication is transmitted from the primary server to the standby server prior to or subsequent to the transmission of the log data from the primary server to the standby server.

An exemplary execution of stage S32 by primary database server 20 involves a parallel flushing of log data to a primary buffer (e.g., a database log buffer), to a primary log disk (e.g., a database log disk), and transmission of the log data to standby database server 21 over network 22. Further, database server 20 transmits the buffer flush boundary indication (s) to standby database server 21 to enable standby database server 21 to determine the log data has been flushed from the primary buffer to the primary log disk.

An exemplary execution of stage S32 by primary file server 23 involves a parallel flushing of log data to a primary buffer (e.g., a journaled file log buffer), to a primary log disk (e.g., a journaled file log disk), and transmission of the log data to standby file server 24 over network 25. Furthermore, primary file server 23 transmits the buffer flush boundary indication(s) to standby file server 24 to enable standby file server 24 to determine the log data has been flushed from the primary buffer to the primary log disk.

Still referring to FIGS. 1-3, a stage S34 of flowchart 30 encompasses a standby server receiving the log data from the primary server, storing the received log data in a standby buffer, receiving the buffer flush boundary indication(s) from the primary server, and processing the received log data in response to the received buffer flush boundary indication(s). As described earlier herein, the received buffer flush boundary indication(s) will indicate a flushing of the log data from the primary buffer to the primary log disk. As such, in view of attaining an optimal transactional consistency, the flushing of the received log data from the standby buffer to the standby log disk by the standby server will mirror the flushing of the log data from the primary buffer to the primary log disk as indicated by the received buffer flush boundary indication(s).

An exemplary execution of stage S34 by standby database server 21 involves a reception of the log data from primary database server 20, a storing of the received log data in a standby database log buffer, a reception of the buffer flush boundary indication(s) from the primary database server 20, and a processing of the received log data in response to the received buffer flush boundary indication(s). Thus, a flushing of the received log data from the standby database log buffer to the standby database log disk by standby database server 21 will mirror a flushing of the log data from a primary database log buffer to a primary database log disk by primary database server 20 as indicated by the received buffer flush boundary indication(s).

An exemplary execution of stage S34 by standby file server 24 involves a reception of the log data from primary file server 23, a storing of the received log data in a standby journaled file log buffer, a reception of the buffer flush boundary indication (s) from the primary file server 23, and a processing of the received log data in response to the received buffer flush boundary indication(s). Thus, a flushing of the received log data from the standby journaled file log buffer to the standby journaled file log disk by standby file server 24 will mirror a flushing of the log data from a primary journaled file log buffer to a primary journaled file log disk by primary file server 23 as indicated by the received buffer flush boundary indication(s).

Still referring to FIGS. 1-3, a bidirectional arrow between stages S32 and S34 signifies that either an execution of stages S32 and S34 by a primary server and a standby server, respectively, can be sequential by stage S32 being entirely executed by a primary server prior to an entire execution of stage S34 by a standby server, or an execution of stages S32 and S34 by a primary server and a standby server, respectively, can be, partially or entirely, concurrent.

In practice, the hardware and software employed to practice the present invention as described in connection with FIGS. 1-3 is dependent upon a particular implementation of the present invention, and is therefore without limit. Thus, the following description of one embodiment of primary database server 20 and standby database server 21 as illustrated in FIG. 4 is not a limitation as to the scope of the present invention.

Figure 4:
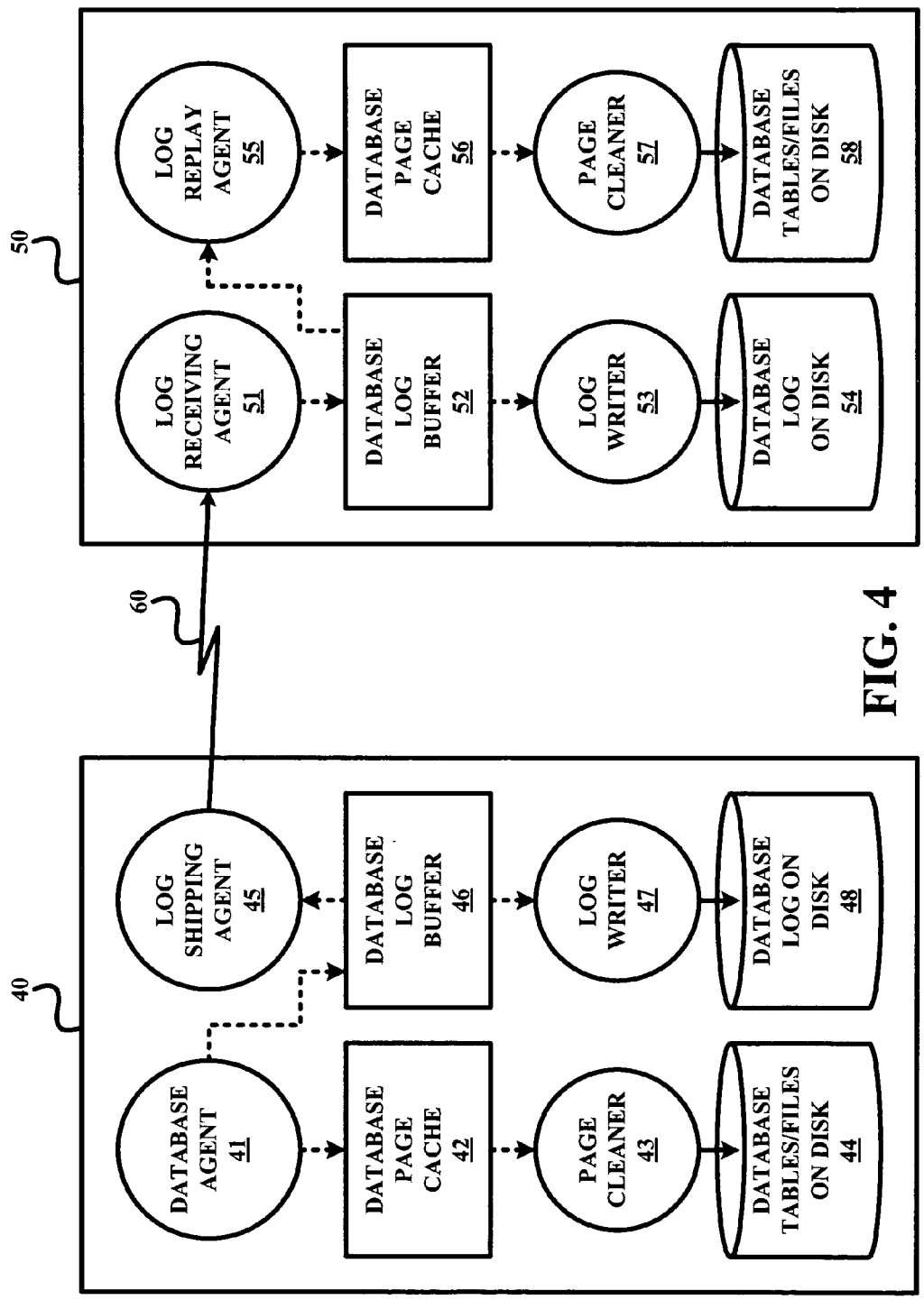
FIG. 4 illustrates one embodiment in accordance with the present invention of the log shipping data replication system illustrated in FIG. 1.

Referring to FIG. 4, a primary data processing system 40 installable within primary database server 20 (FIG. 1) employs an arrangement of a database agent 41, a database page cache 42, a page cleaner 43, a database tables/files on disk 44, a log shipping agent 45, a database log buffer 46, a log writer 47, and a database log on disk 48. Similarly, a standby data processing system 50 installable within standby database server 21 (FIG. 1) employs an arrangement of a log receiving agent 51, a database log buffer 52, a log writer 53, a database log on disk 54, a log replay agent 55, a database page cache 56, a page cleaner 57, and a database tables/files on disk 58. Memory accesses are represented by the dashed arrows, and data transfers among the components are represented by the solid arrows.

Primary data processing system 40 is operational via a network communication channel 60 with standby data processing system 50, which is initialized from a full copy of primary data processing system 40. Generally, primary data processing system 40 includes database agent 41 for performing updates to database pages in memory. Updates to database pages remain in a database page cache 42 until a record of the updated database pages within database page cache 42 are written in a local copy of a database log file 48 by a log writer 47. Updated database pages are themselves subsequently written to a database disk 44 by page cleaner 43. The database log file is a record of all changes made to primary data processing system 40. Log records are first created and accumulated in memory pages of a database log buffer 46. When a log shipping data replication of the present invention is implemented, the log data stored within database log buffer 46 is written by log writer 47 to log disk 48 and concurrently sent by log shipping agent 45 over network communication channel 60 to log receiving agent 51 whereby log receiving agent 51 accepts the log data and buffers the received log data in database log buffer 52.

Log shipping agent 45 will also transmit one or more buffer flush boundary indications to log receiving agent 5 1 to thereby enable log receiving agent 5 1 to determine the log data has been flushed from database log buffer 46 by log writer 47 to database log disk 48. Based on the buffer flush boundary indication(s), the received log pages are flushed from database log buffer 52 by log writer 53 to database log disk 54 with an optimal degree of transactional consistency and minimal burden on system 40. Thereafter, log replay agent 55 can be provided access to the log data stored within database log buffer 52 to thereby apply the effects of the changes reflected in the log records to the copy of the database on disk 58 by replaying the log records directly to disk 58 or replaying the log records by updating data pages in database page cache 56, which is periodically written to a database disk 58 via a page cleaner 57. By continuously shipping log records from primary data processing system 40 to standby data processing system 50 and replaying the log records against the copy of standby data processing system 50, standby data processing system 50 maintains an optimal replica of primary data processing system 40.

Figure 9:
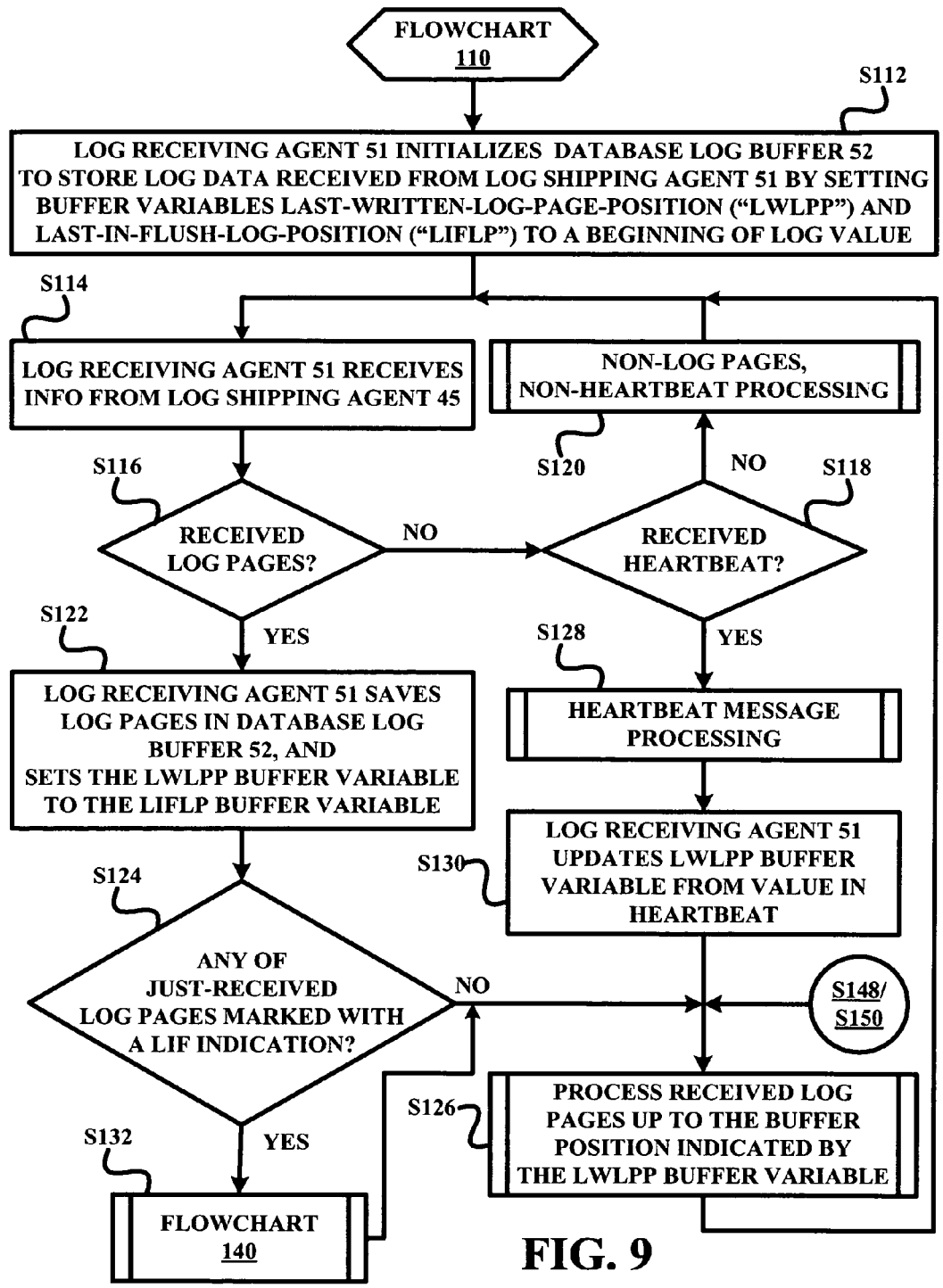
FIG. 9 illustrates a flowchart representative of a first embodiment of a standby-side log shipping data replication method in accordance with the present invention.
Figure 10:
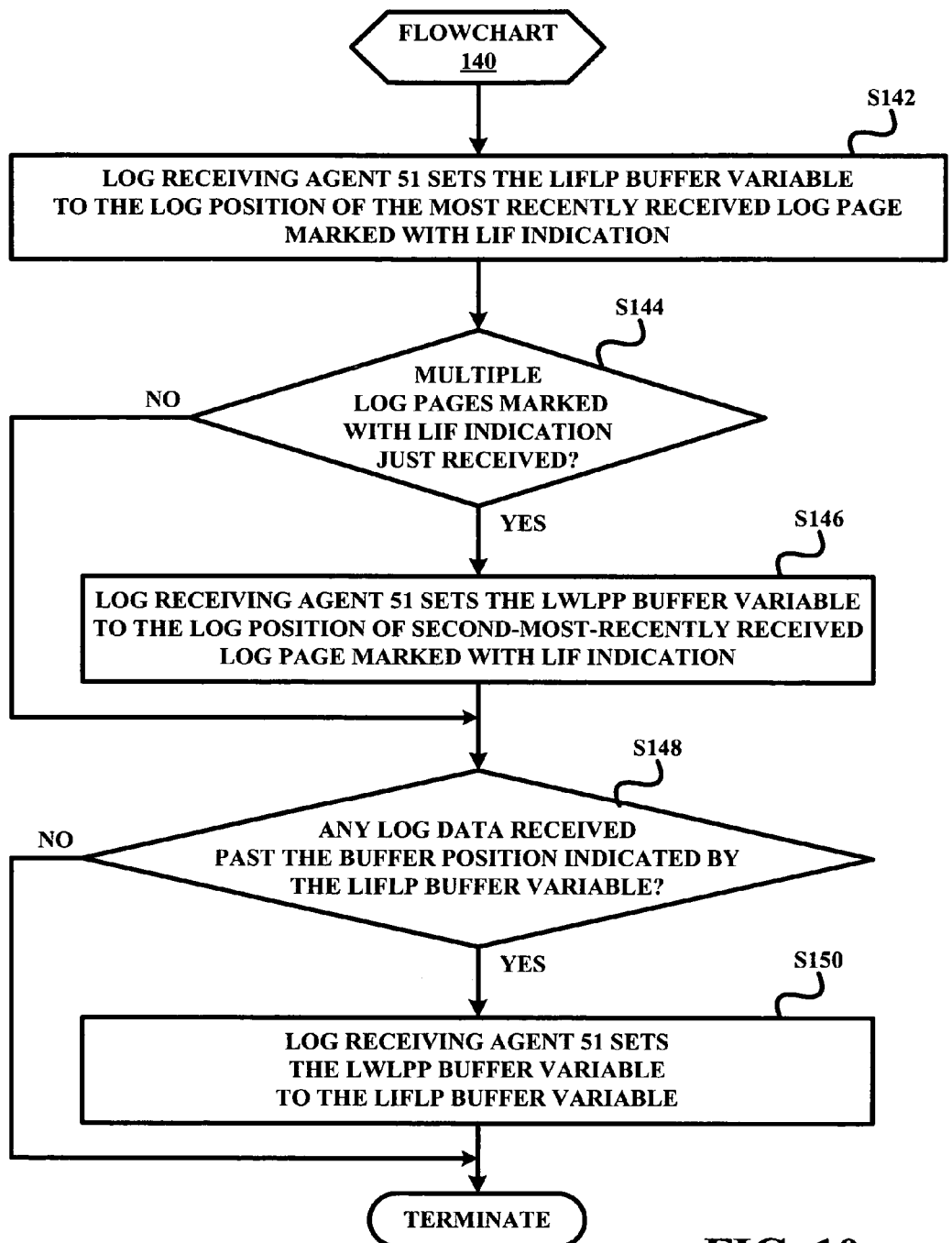
FIG. 10 illustrates a flowchart representative of one embodiment of a "Last-In-Flush" processing method in accordance with the present invention.

Specifically, as directly related to the log-shipping data replication of the present invention, log shipping agent 45 and log writer 47 are software modules programmed to implement a flowchart 70 (FIG. 5), and a flowchart 90 (FIG. 7), and log receiving agent 51 and log writer 53 are software modules programmed to implement a flowchart 110 (FIG. 9) and a flowchart 140 (FIG. 10). In an alternate embodiment, log shipping agent 45 and log writer 47 are software modules programmed to implement a flowchart 160 (FIG. 21), and log receiving agent 51 and log writer 53 are software modules programmed to implement a flowchart 170 (FIG. 22). The following is a description of these various flowcharts.

Figure 5:
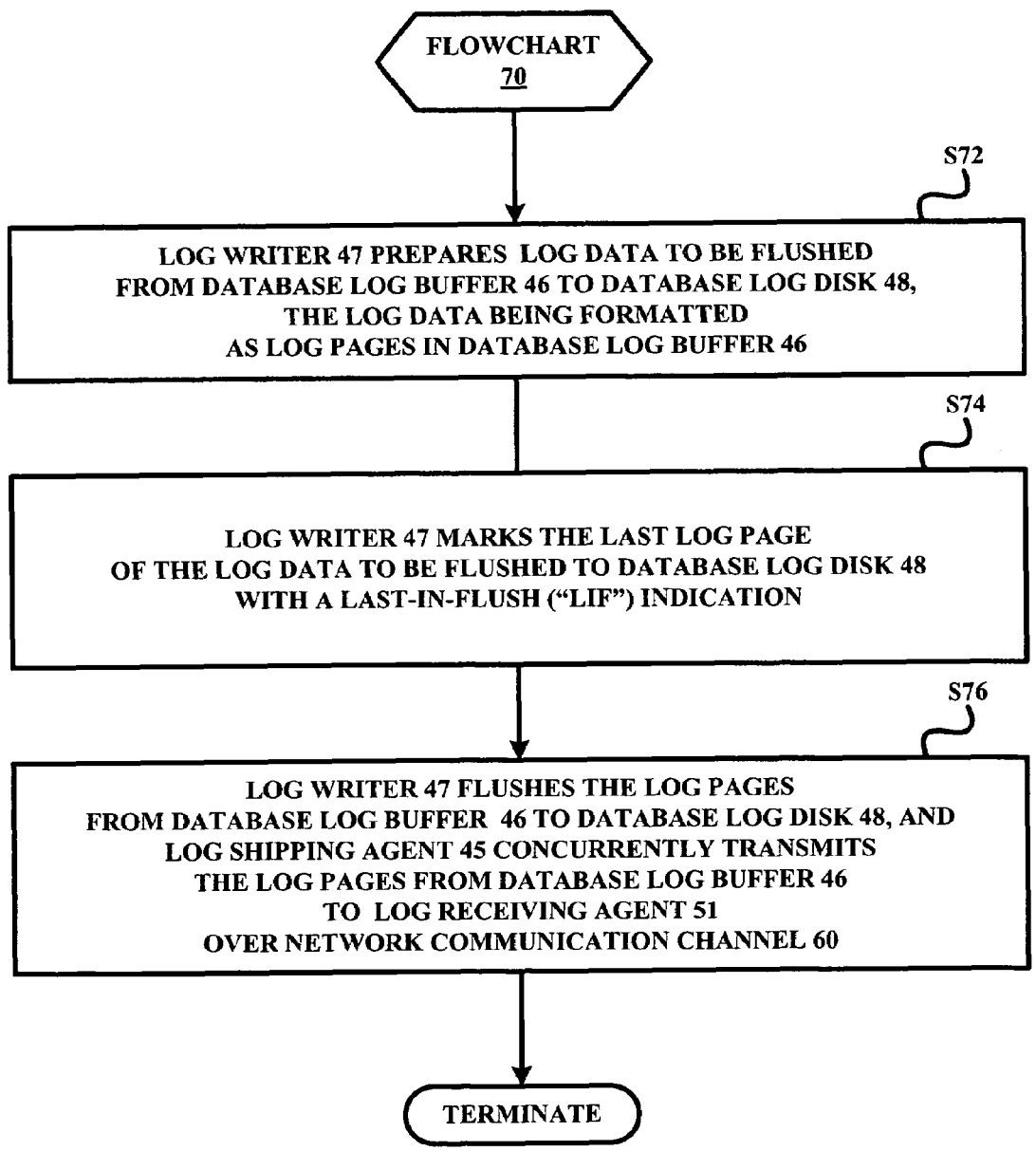
FIG. 5 illustrates a flowchart representative of a first embodiment of a primary-side log shipping data replication method in accordance with the present invention.
Figure 6:
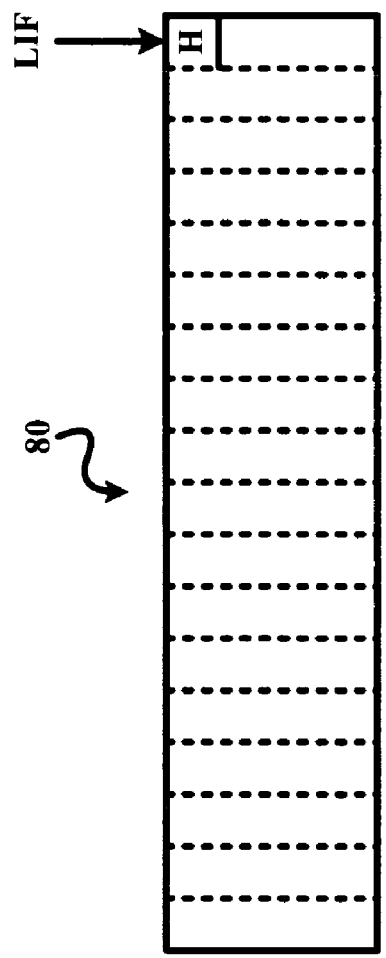
FIG. 6 illustrates an exemplary "Last-In-Flush" marking of a last log page.

Referring to FIGS. 4 and 5, flowchart 70 is representative of a primary-side log-shipping data replication of the present invention that is performed when system 40 is active. A stage S72 of flowchart 70 encompasses log writer 47 preparing log data to be flushed from database log buffer 46 to database log disk 48 where the log data is formatted in database log buffer 46 as a sequential series of fixed size log data portions commonly referred to as log pages. A stage S74 of flowchart 70 encompasses log writer 47 marking the last log page of the log data with a buffer flush boundary indication in the form of a last-in-flush ("LIF") indication indicating an ending boundary of the log data. In one embodiment, as exemplarily illustrated in FIG. 6, a bit within a header H of a last log page of a group of log pages to be flushed 80 is set to provide the LIF indication. Returning to FIG. 5, a stage S76 of flowchart 70 encompasses log writer 47 flushing the log pages from database log buffer 46 to database log disk 48, and log shipping agent 45 concurrently transmitting the log pages from database log buffer 46 to log receiving agent 51 over network communication channel 60. Flowchart 70 is terminated after stage S76 whereby those having ordinary skill in the art will appreciate an implementation of flowchart 70 serves as one embodiment of stage S32 of flowchart 30 (FIG. 3).

In one alternative embodiment of stage S74, another log page of the log data can be marked with an indication indicating a boundary of the log data, such as, for example, the first log page of the log data can be marked with a first-in-flush ("FIF") indication indicating a beginning boundary of the log data.

Figure 8:
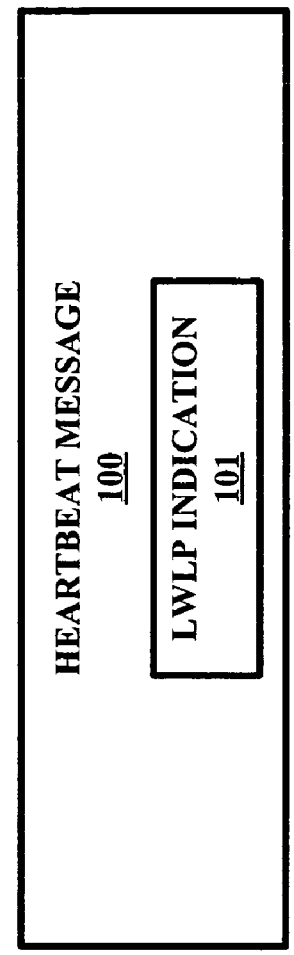
FIG. 8 illustrates an exemplary heartbeat message in accordance with the present invention.
Figure 7:
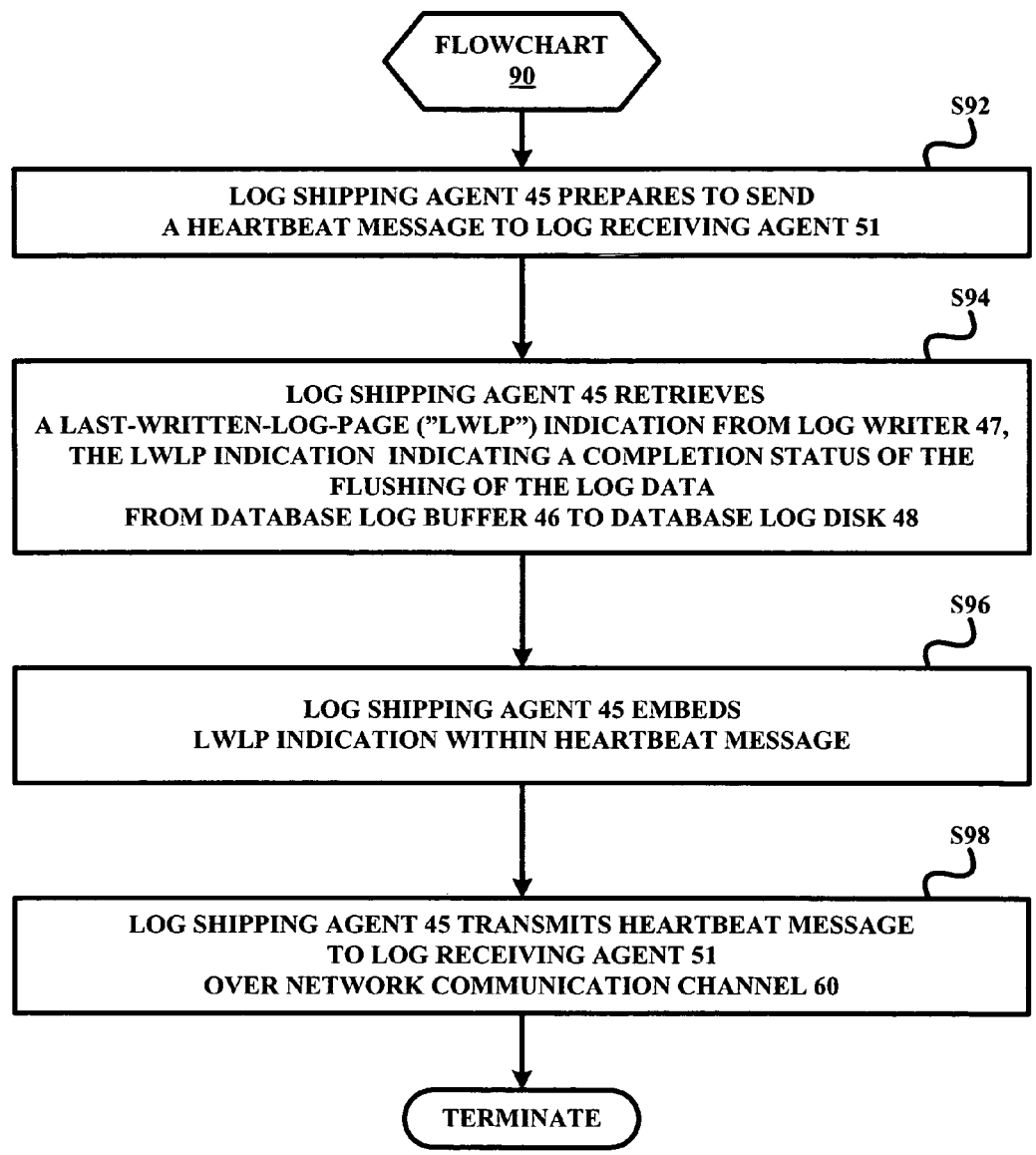
FIG. 7 illustrates a flowchart representative of one embodiment of a heartbeat message method in accordance with the present invention.

Referring to FIGS. 4 and 7, flowchart 90 is representative of a heartbeat message method of the present invention that is performed when system 40 is idle. A stage S92 of flowchart 90 encompasses log shipping agent 45 preparing to send a heartbeat message to log receiving agent 51. The heartbeat message will contain conventional information related to a health of system 40. A stage S94 of flowchart 90 encompasses log shipping agent 45 retrieving a buffer flush boundary indication from log writer 47 in the form of a last-written-log-page ("LWLP") indication indicating a successful flushing of the log data from database log buffer 46 to database log disk 48. A stage S96 of flowchart 90 encompasses log shipping agent 45 embedding the LWLP indication within the heartbeat message as exemplarily shown in FIG. 8 with a LWLP indication 101 being embedded within a heartbeat message 100. Returning to FIG. 7, a stage S98 of flowchart 90 encompasses log shipping agent 45 transmitting the heartbeat message to log receiving agent 51 over network communication channel 60. Flowchart 90 is terminated after stage S98 whereby those having ordinary skill in the art will appreciate that an implementation of flowchart 90 serves as a communication of a buffer flush boundary indication by system 40 to system 50 within a message providing information as to the health of system 40.

Figure 11:
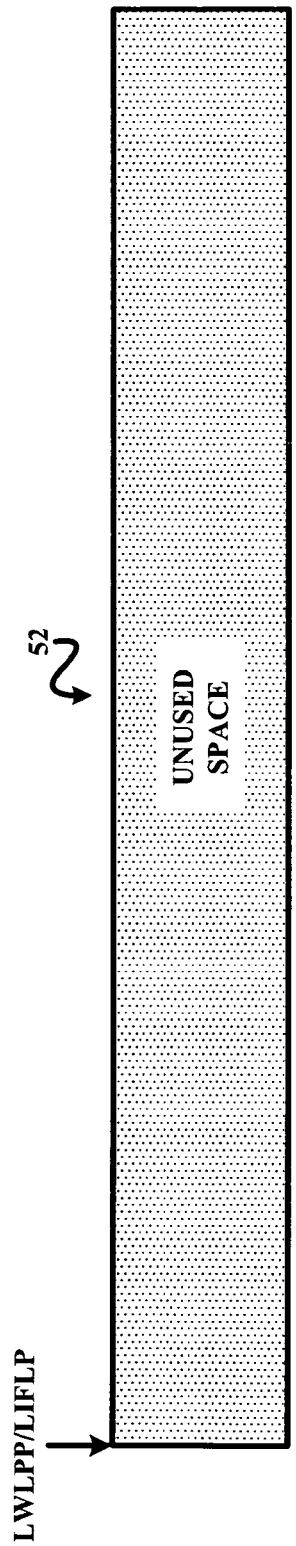
FIGS. 11-20 illustrate exemplary operational states of a database log buffer of a standby data processing system during an execution of the flowcharts illustrated in FIGS. 9 and 10.

Referring to FIGS. 4 and 9, flowchart 110 is representative of a standby-side log-shipping data replication of the present invention that is based on processing each buffer flush boundary indication received from an active system 40 in the form of a LIF indication embedded in the log data and each buffer flush boundary indication received from an idle system 40 in the form of a LWLP indication embedded within a heartbeat message. A stage S112 of flowchart 110 encompasses log receiving agent 51 initializing database log buffer 52 to store log data received from log shipping agent 45 and further setting a pair of buffer variables in the form of a last-written-log-page-position ("LWLPP") and a last-in-flush-log-position ("LIFLP") to a beginning of log value in database log buffer 52 (i.e., an initial position of unused space within database log buffer 52 reserved for the log data) as exemplarily shown in FIG. 11.

A stage S114 of flowchart 110 encompasses log receiving agent 51 receiving information from log shipping agent 45, a stage S116 of flowchart 110 encompasses log receiving agent 51 determining whether log pages were received during stage S114, and a stage S118 of flowchart 110 encompasses log receiving agent 51 determining whether a heartbeat message was received during stage S114 if log pages were not received during stage S114. The information received during stage S114 will either be log pages, a heartbeat message or non-log, non-heartbeat information.

If the information received by log receiving agent 51 during stage S114 is non-log, non-heartbeat information, then log receiving agent 51 proceeds from stage S114 through stages S116 and S118 to a stage S120 to conventionally process the non-log, non-heartbeat information and then return to stage S114.

If the information received by log receiving agent 51 during stage S114 consists of log pages, then log receiving agent 51 proceeds from stage S114 through stage S116 to a stage S122 of flowchart 110 to save the log pages to database log buffer 52 and set the LWLPP buffer variable to the LIFLP buffer variable, and then to a stage S124 of flowchart 110 to determine if a LIF indication can be found in any of the log pages. If none of the just-received log pages are marked with a LIF indication, then log receiving agent 51 proceeds to a stage S126 of flowchart 110 to facilitate a processing of any previously unavailable received log pages up to a position in database log buffer 52 indicated by the LWLPP buffer variable by making the log pages available to log writer 53 and log replay agent 55. Otherwise, log receiving agent 51 proceeds to a stage S132 of flowchart 110 to execute flowchart 140.

Referring to FIGS. 4 and 10, a stage S142 of flowchart 140 encompasses log receiving agent 51 setting the LIFLP buffer variable to the log position of the most recently received log page marked with the LIF indication, and a stage S144 of flowchart 140 encompasses log receiving agent 51 determining whether multiple log pages of the just received log pages are marked with the LIF indication. If multiple log pages of the just received log pages are marked with the LIF indication, then log receiving agent 51 proceeds to a stage S146 of flowchart 140 to set the LWLPP buffer variable to the log position of the second-most-recently received log page marked with the LIF indication.

If multiple log pages of the just received log pages are not marked with the LIF indication as determined during stage S144, or upon completing stage S146, log receiving agent 51 proceeds to a stage S148 of flowchart 140 to determine whether any log data was received past the buffer position indicated by the LIFLP buffer variable. If log data was received past the buffer position indicated by the LIFLP buffer variable, then log receiving agent 51 proceeds to a stage S150 of flowchart 140 to set the LWLPP buffer variable to the LIFLP buffer variable. If log data was not received past the buffer position indicated by the LIFLP buffer variable, or upon completing stage S150, log receiving agent 51 terminates flowchart 140 and proceeds to stage S126 (FIG. 9) to facilitate a processing of any previously unavailable received log pages up to a position in database log buffer 52 indicated by the LWLPP buffer variable by making the log pages available to log writer 53 and log replay agent 55, and then return to stage S114 (FIG. 9).

Referring again to FIGS. 4 and 9, if the information received by log receiving agent 51 during stage S114 is a heartbeat message, then log receiving agent 51 proceeds from stage S114 through stages S116 and S118 to a stage S128 of flowchart 110 to conventionally process the heartbeat message and then to a stage S130 of flowchart 110 to update the LWLPP buffer variable to the LWLP indication value in the heartbeat message. From there, log receiving agent 51 will proceed to stage S126 to facilitate a processing of any previously unavailable received log pages up to a position in database log buffer 52 indicated by the LWLPP buffer variable by making the log pages available to log writer 53 and log replay agent 55, and then return to stage S114.

Referring to FIGS. 4, 9 and 10, to facilitate a working understanding of flowcharts 110 and 140, the determination stages S116, S118, S124, S144, and S148 will be described in the context of three (3) log shipping data replication scenarios.

The first scenario involves, over a couple of iterations of stage S114, log receiving agent 51 sequentially receiving a "Peer State" message (i.e., an exemplary non-log, non-heartbeat message), a group of log pages having the last log page marked with a LIF indication, and a heartbeat message having a LWLP indication.

First, a reception of the Peer State message by log receiving agent 51 during an initial execution of stage S114 informs log receiving agent 51 that log shipping agent 45 will start transmitting new log pages to log receiving agent 51 concurrent to the flushing of the log pages from database log buffer 46 to database log disk 48 by log writer 47. In view of the fact that Peer State message is a non-log, non-heartbeat message, log receiving agent 51 will proceed from stage S114 through determination stages S116 and S118 to conventionally process the Peer State message during a stage S120 and then return to stage S114.

Figure 12:
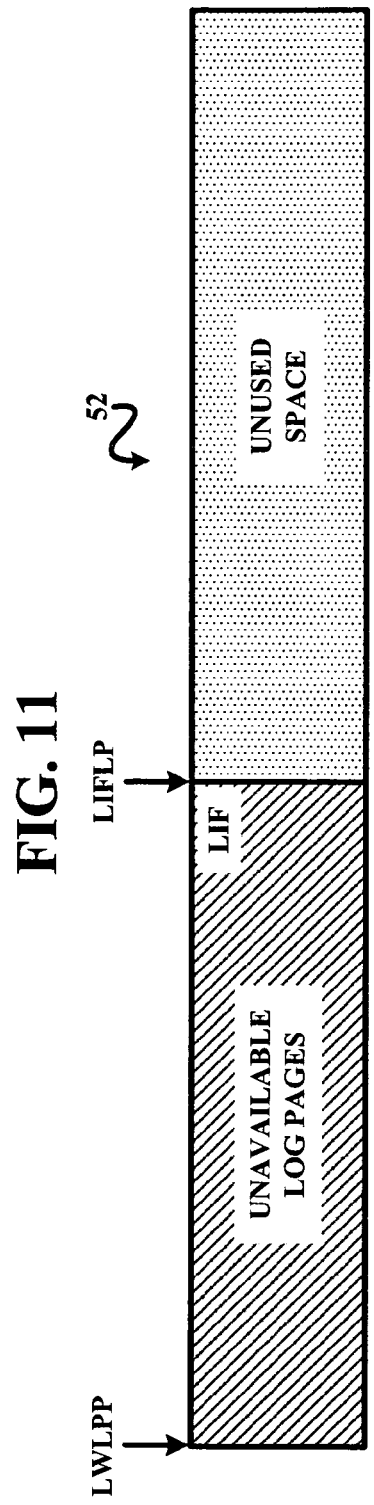

Second, a reception of the log pages having the last log page marked with the LIF indication by log receiving agent 51 during a second iteration of stage S114 triggers log receiving agent 51 to proceed to a stage S122 of flowchart 110 to save the log pages in database log buffer 52 and set the LWLPP buffer variable to the LIFLP buffer variable (which in this case was previously initialized in stage S112). In view of the fact that a log page of the just-received log pages is marked with a LIF indication, log receiving agent 51 proceeds from stage S122 through a stage S124 of flowchart 110 to a stage S132 of flowchart 110 to implement a flowchart 140 as illustrated in FIG. 10. Referring to FIGS. 4 and 10, a stage S142 of flowchart 140 encompasses log receiving agent 51 setting the LIFLP buffer variable to the log position of the most recently received log page marked with the LIF indication, which in this case is the last log page marked with LIF indication as exemplarily shown in FIG. 12. In view of the fact that there is just one log page marked with the LIF indication among the most recently receive log pages, and log receiving agent 51 has not received any log data past the position indicated by the LIFLP buffer variable, log receiving agent 51 will thereafter proceed from stage S142 through a pair of determination stages S144 and S148 to stage S126 of flowchart 110.

Referring again to FIGS. 4 and 9, stage S126 encompasses log receiving agent 51 making any previously unavailable received log pages up to a position within database log buffer 52 as indicated by the LWLPP buffer variable available to log writer 53 for flushing purposes and log replay agent 55 for replay purposes. However, all of the log pages within database log buffer 52 are after the LWLPP buffer variable as exemplarily shown in FIG. 12 whereby stage S126 processes no log pages. Subsequently, log receiving agent 51 returns to stage S114.

Figure 13:
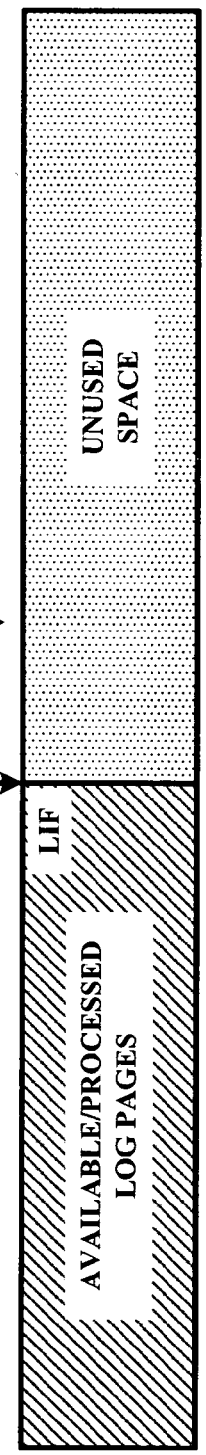

Finally, a reception of the heartbeat message having the LWLP indication by log receiving agent 51 during a third iteration of stage S114 triggers log receiving agent 51 to proceed from stage S114 through determination stages S116 and S118 to a stage S128 of flowchart 110 whereby the heartbeat message is processed by log receiving agent 51. Upon reading the LWLP indication during stage S128, log receiving agent 51 proceeds to a stage S130 of flowchart 110 to update the LWLPP buffer variable to the LWLP indication in the heartbeat message, as exemplarily illustrated in FIG. 13, whereby any previously unavailable log pages up to a position within database log buffer 52 as indicated by the LWLPP buffer variable are available for flushing. The available log pages are flushed to database log disk 54 and made available to log replay agent 55 during stage S126 as further exemplarily illustrated in FIG. 13.

In a second scenario, still referring to FIGS. 4, 9 and 10, those having ordinary skill in the art will appreciate the fact that the nature of network communication channel 60 may facilitate a reception by log receiving agent 51 of multiple sets of log pages with each set having a last log page marked with a LIF indication despite the fact that log shipping agent 45 may have transmitted the multiple sets of log pages to log receiving agent 51 in separate transmissions. To facilitate a basic understanding of flowcharts 110 and 140 under such a scenario, flowchart 110 will now be described in the context of log receiving agent 51 sequentially receiving a Peer State message (i.e., a non-log, non-heartbeat message), log pages where two of the log pages are marked with a LIF indication, and a heartbeat message having a LWLP indication.

First, log receiving agent 51 will process the Peer State message as previously described herein.

Figure 14:
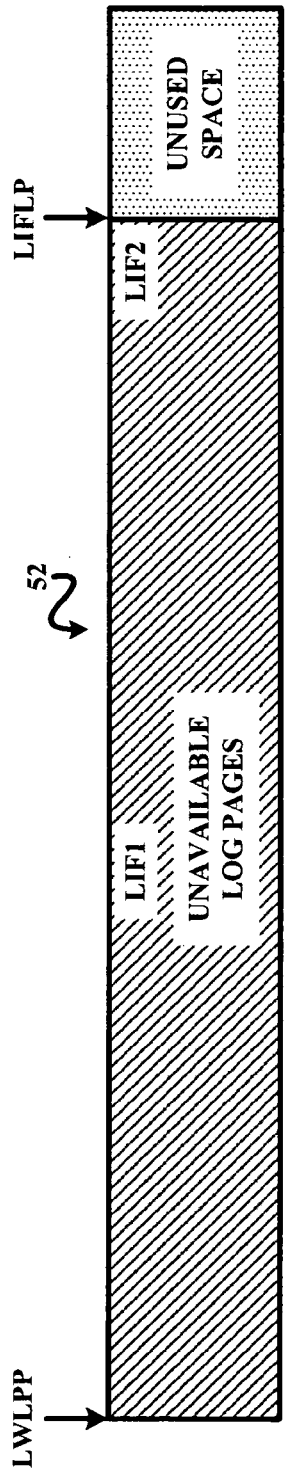
Figure 15:
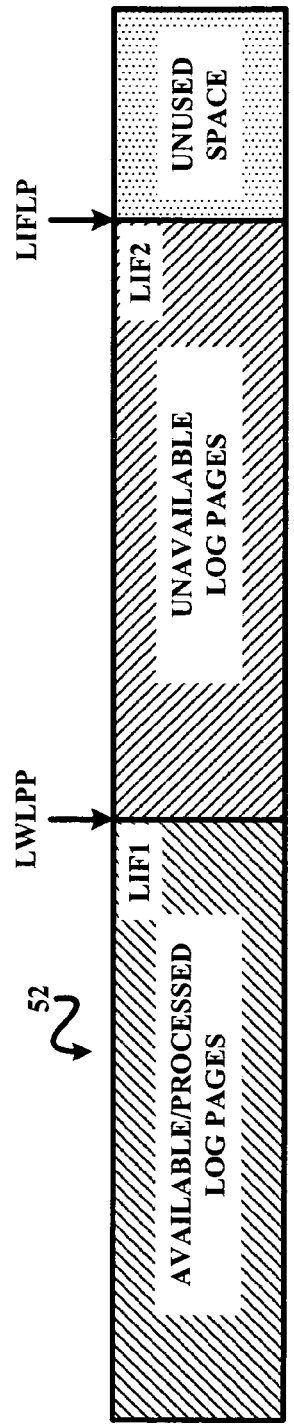

Second, a reception by log receiving agent 51 during a second iteration of stage S114 of the log pages with two log pages marked with the LIF indication triggers log receiving agent 51 to proceed from stage S114 through stages S116-S122-S124-S132 to stage S142 whereby log receiving agent 51 sets the LIFLP buffer variable to the log position of the most recently received log page marked with a LIF indication LIF2 as exemplarily shown in FIG. 14. In view of the fact that log receiving agent 51 received multiple log pages marked with the LIF indication, log receiving agent 51 will proceed from stage S142 through decision stage S144 to a stage S146 of flowchart 140 (FIG, 10). Stage S146 encompasses log receiving agent 51 setting the LWLPP buffer variable to the log position of the second-most-recently-received log page marked with a LIF indication LIF1 as exemplarily shown in FIG. 15. In view of the fact log receiving agent 51 has not received any log data past the position indicated by the LIFLP buffer variable, log receiving agent 51 will thereafter proceed from stage S146 through decision stage S148 to stage S126 of flowchart 110 whereby any previously unavailable log pages up to the position indicated by the LWLPP buffer variable as exemplarily shown in FIG. 15 are available for flushing and are subsequently flushed from database log buffer 52 by log writer 53 to database log disk 54 and made available to log replay agent 55.

Figure 16:
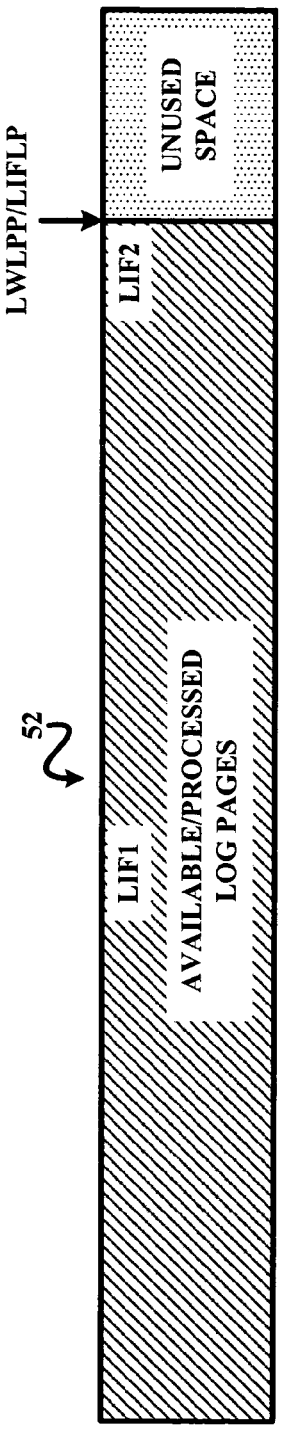

Finally, a reception of the heartbeat message having the LWLPP indication by log receiving agent 51 during a third iteration of stage S114 triggers log receiving agent 51 to proceed from stage S114 through stages S116-S118-S128 to stage S130 as previously described herein to update the LWLPP buffer variable to the LWLP indication in the heartbeat message as exemplarily illustrated in FIG. 16, whereby any previously unavailable log pages up to a position within database log buffer 52 as indicated by updated the LWLPP buffer variable are available for flushing. Subsequently, the available log pages are flushed to database log disk 54, and made available to log replay agent 55, during stage S126 as further exemplarily illustrated in FIG. 16.

In a third scenario, still referring to FIGS. 4, 9 and 10, those having ordinary skill in the art will appreciate the fact that the nature of network communication channel 60 may facilitate a reception by log receiving agent 51 of a log page marked with a LIF indication that is not the last log page of the received log pages. This could occur, for example, if system 40 performed two log flushes close together in time and not all pages from the second log flush have been received yet at the standby system 50. To facilitate a basic understanding of flowcharts 110 and 140 under such a scenario, flowchart 110 will now be described in the context of log receiving agent 51 sequentially receiving a Peer State message (i.e., a non-log, non-heartbeat message), a first group of log pages where a middle log page is marked with the LIF indication, a second group of log pages where the last page is marked with the LIF indication, and a heartbeat message having a LWLP indication.

First, log receiving agent 51 will process the Peer State message as previously described herein.

Second, a reception of the first group of log pages having a middle log page marked with the LIF indication by log receiving agent 51 during a second iteration of stage S114 triggers log receiving agent 51 to proceed to a stage S122 of flowchart 110 to save the log pages in database log buffer 52 and set the LWLPP buffer variable to the LIFLP buffer variable (which in this case was previously initialized in stage S112). In view of the fact that a log page of the just-received log pages is marked with a LIF indication, log receiving agent 51 proceeds from stage S122 through stages S124 and S132 to stage S142 of flowchart 140 whereby log receiving agent 51 sets the LIFLP buffer variable to the log position of the most recently received log page marked with the LIF indication, which in this case is the middle log page marked with LIF indication LIF1 as exemplarily shown in FIG. 17. In view of the fact that there is just one log page marked with the LIF indication among the most recently receive log pages, and log receiving agent 51 has received some log data past the position indicated by the LIFLP buffer variable, log receiving agent 51 will thereafter proceed from stage S142 through determination stages S144 and S148 to a stage S150 of flowchart 140. Stage S150 encompasses log receiving agent 51 setting the LWLPP buffer variable to the LIFLP buffer variable as exemplarily shown in FIG. 18, whereby any previously unavailable log pages up to a position within database log buffer 52 as indicated by the LWLPP buffer variable are available for flushing. Subsequently, the available log pages are flushed from database log buffer 52 by log writer 53 to database log disk 54, and made available to log replay agent 55, during stage S126. Log receiving agent 51 thereafter returns to stage S114.

Figure 17:
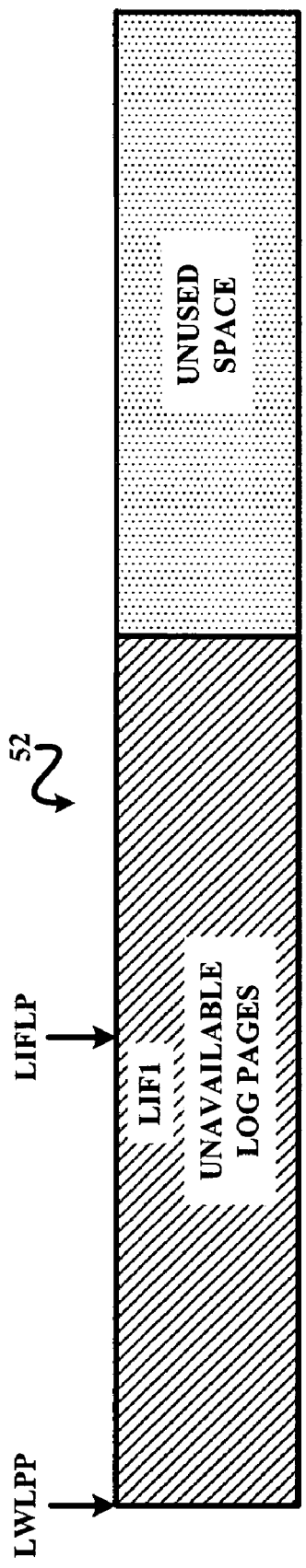
Figure 18:
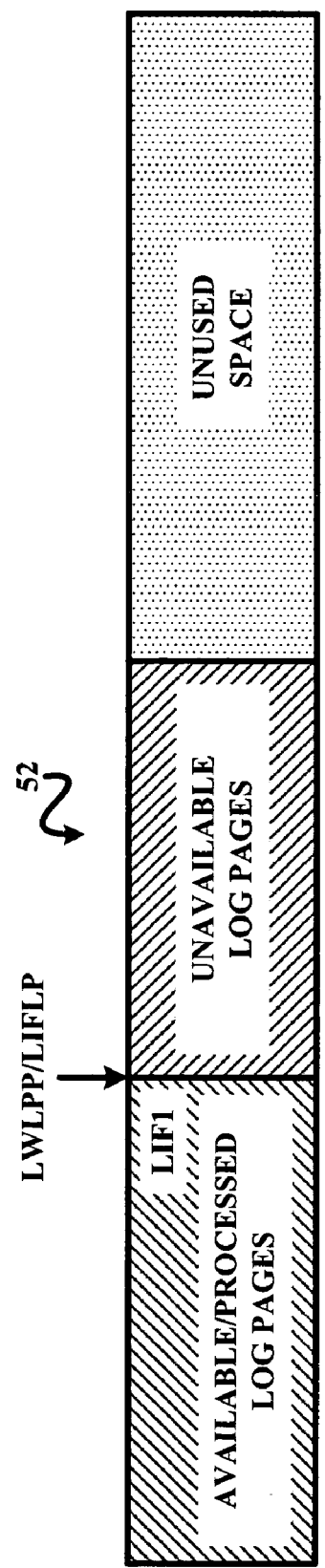
Figure 19:
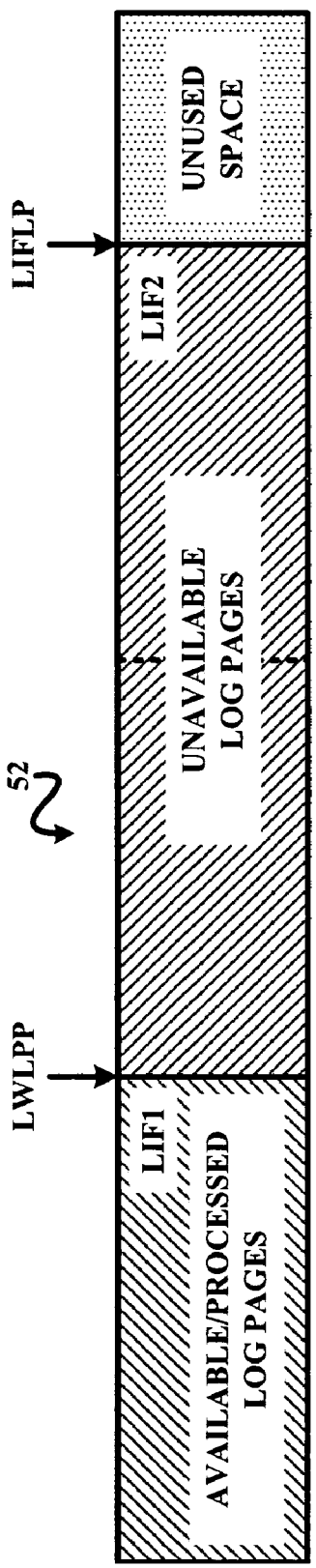

Third, a reception of the second group of log pages having the last log page marked with the LIF indication by log receiving agent 51 during a third iteration of stage S114 triggers log receiving agent 51 to proceed to a stage S122 of flowchart 110 to save the log pages in database log buffer 52 and set the LWLPP buffer variable to the LIFLP buffer variable (which in this case is not a change from the value that was previously set as illustrated in FIG. 17). In view of the fact that a log page of the just-received log pages is marked with a LIF indication, log receiving agent 51 proceeds from stage 122 through a stage 124 of flowchart 110 to a stage S132 of flowchart 110 to implement a flowchart 140 as illustrated in FIG. 10. Referring to FIGS. 4 and 10, a stage S142 of flowchart 140 encompasses log receiving agent 51 setting the LIFLP buffer variable to the log position of the most recently received log page marked with the LIF indication, which in this case is the last log page marked with LIF indication LIF2 as exemplarily shown in FIG. 19. In view of the fact that there is just one log page marked with the LIF indication among the most recently received log pages, and log receiving agent 51 has not received any log data past the position indicated by the LIFLP buffer variable, log receiving agent 51 will thereafter proceed from stage S142 through a pair of determination stages S144 and S148 to stage S126 of flowchart 110. After stage S126 acts to flush log pages to log disk 54 and make them available to replay agent 55 as previously described, log receiving agent 51 returns to stage S114.

Figure 20:
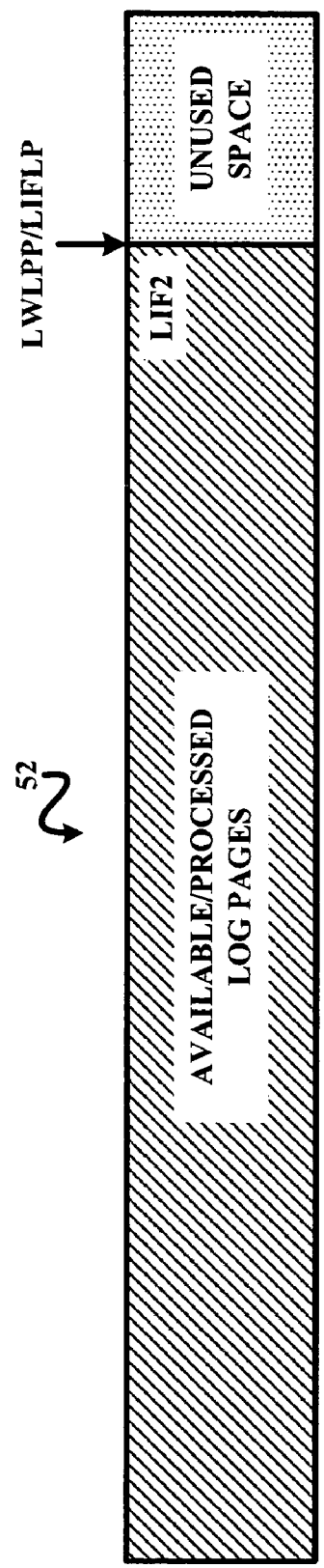

Finally, a reception of the heartbeat message having the LWLP indication by log receiving agent 51 during a fourth iteration of stage S114 triggers log receiving agent 51 to proceed from stage S114 through stages S116-S118-S128 to stage S130 as previously described herein to update the LWLPP buffer variable to the LWLP indication in the heartbeat message as exemplarily illustrated in FIG. 20, whereby any previously unavailable log pages up to a position within database log buffer 52 as indicated by updated the LWLPP buffer variable are available for flushing. Subsequently, the available log pages are flushed to database log disk 54 and made available to log replay agent 55 during stage S126 as further exemplarily illustrated in FIG. 20.

Those having ordinary skill in the art will appreciate one practical embodiment of flowchart 30 (FIG. 3) from the preceding description of flowcharts 70 (FIG. 5), 90 (FIG. 7), 110 (FIG. 9) and 140 (FIG. 10). Those having ordinary skill in the art will further appreciate an additional practical embodiment of flowchart 30 with the following description of a flowchart 160 (FIG. 21) and a flowchart 170 (FIG. 22).

Figure 21:
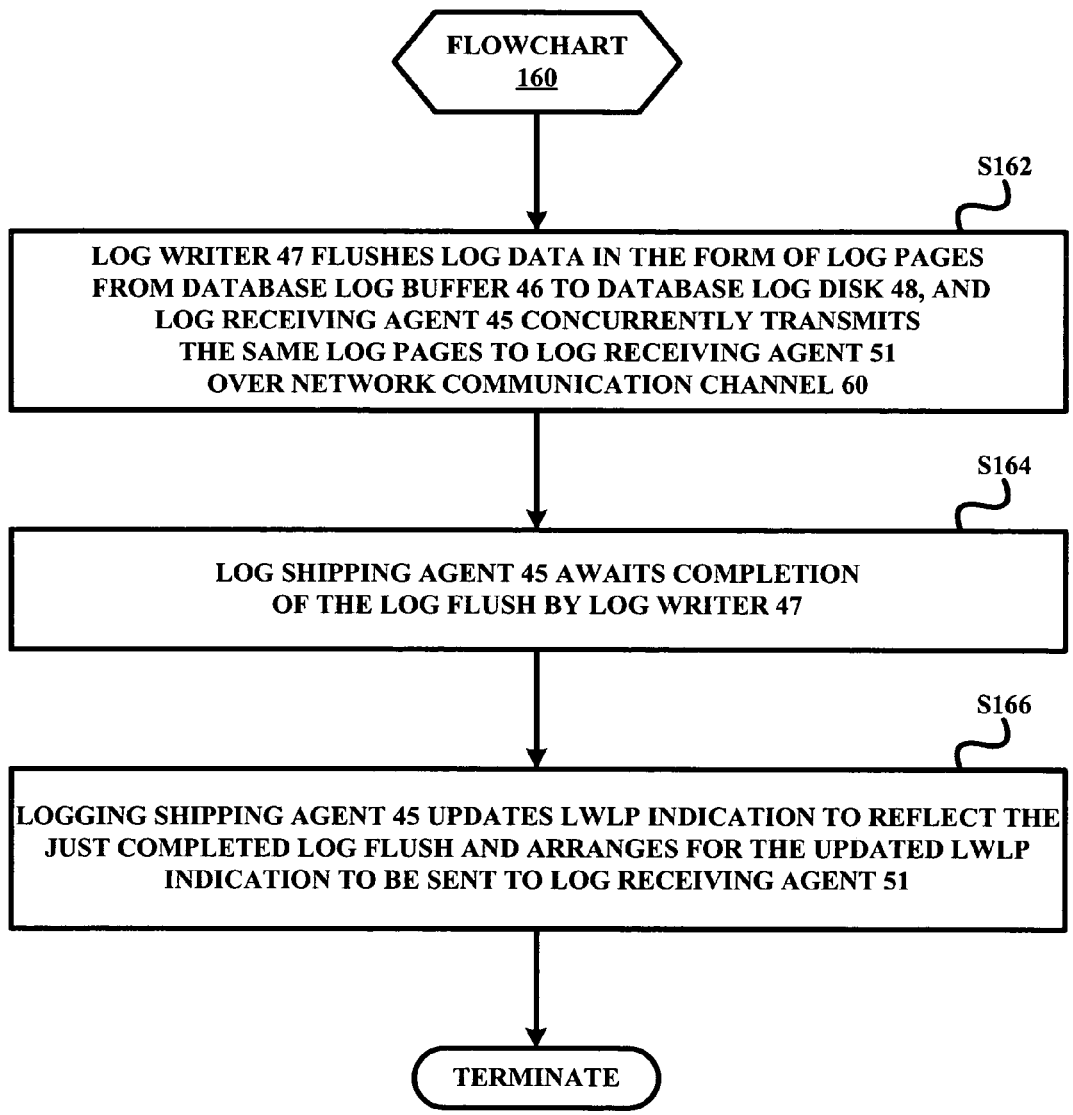
FIG. 21 illustrates a flowchart representative of a second embodiment of a primary-side log shipping data replication method in accordance with the present invention.
Figure 22:
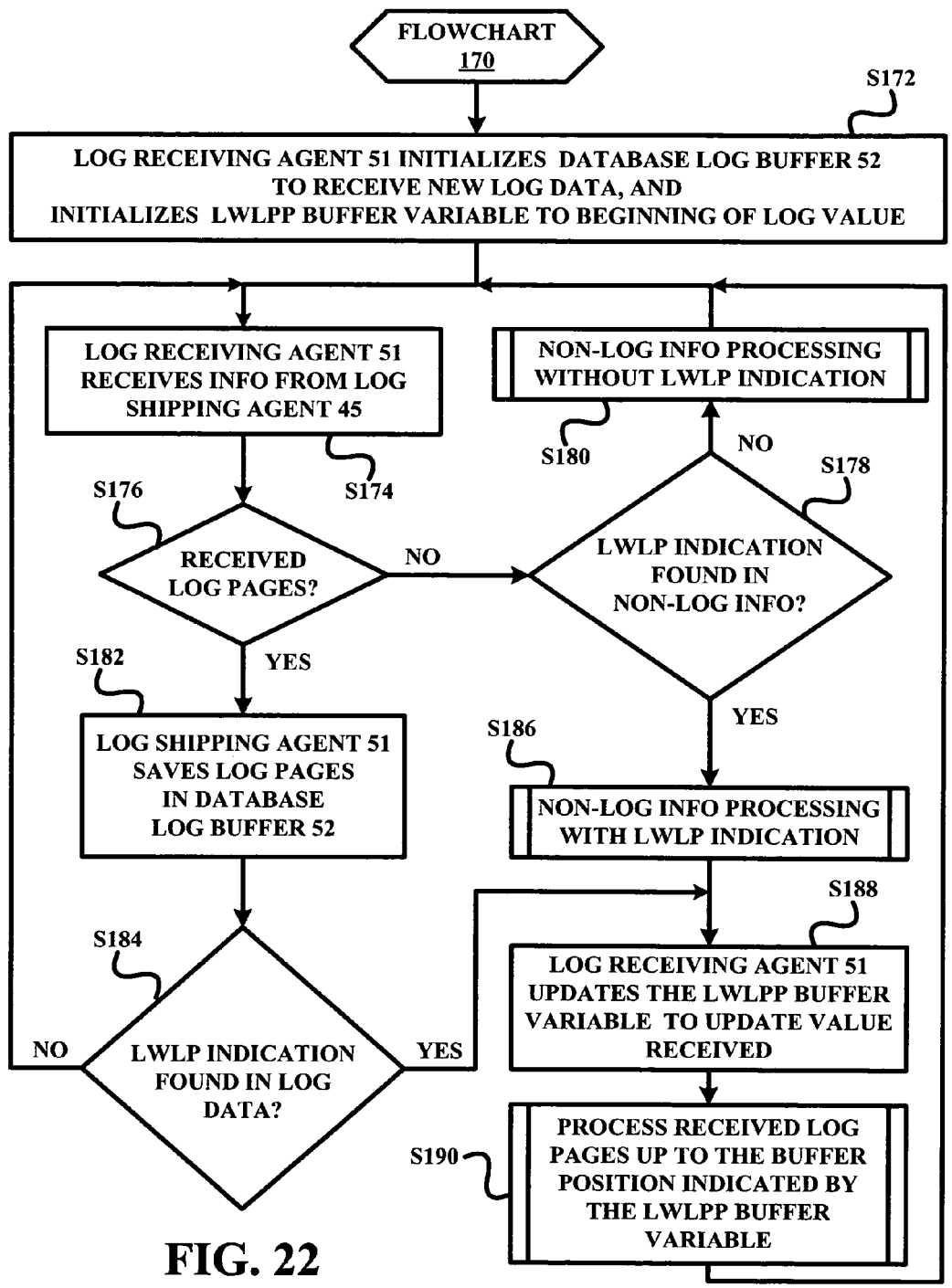
FIG. 22 illustrates a flowchart representative of a second embodiment of a standby-side log shipping data replication method in accordance with the present invention.

Referring to FIGS. 4 and 21, flowchart 160 is representative of a primary-side log-shipping data replication of the present invention that is performed when system 40 is active. A stage S162 of flowchart 160 encompasses log writer 47 flushing log data in the form of log pages from database log buffer 46 to database log disk 48, and log shipping agent 45 concurrently transmitting the same log pages to log receiving agent 51 over network communication channel 60.

A stage S164 of flowchart 160 encompasses log shipping agent 45 awaiting a completion of the log flush by log writer 47, whereby log shipping agent 45 proceeds to a stage S166 of flowchart 160 upon the completion of the log flush by log writer 47. Stage S166 encompasses log shipping agent 45 updating the LWLP indication to reflect the just completed log flush by log writer 47. Log shipping agent 45 further arranges for the updated LWLP indication to be transmitted to log receiving agent 51, such as, for example, by network communication channel 60 or by another type of communication channel between systems 40 and 50. The transmission of the updated LWLP indication can involve an embedding of the LWLPP indication within the log pages, a heartbeat message or any other data form, or as an individual message.

Flowchart 160 is terminated after stage S166 whereby those having ordinary skill in the art will appreciate an implementation of flowchart 160 serves as one embodiment of stage S32 of flowchart 30 (FIG. 3).

Figure 23:
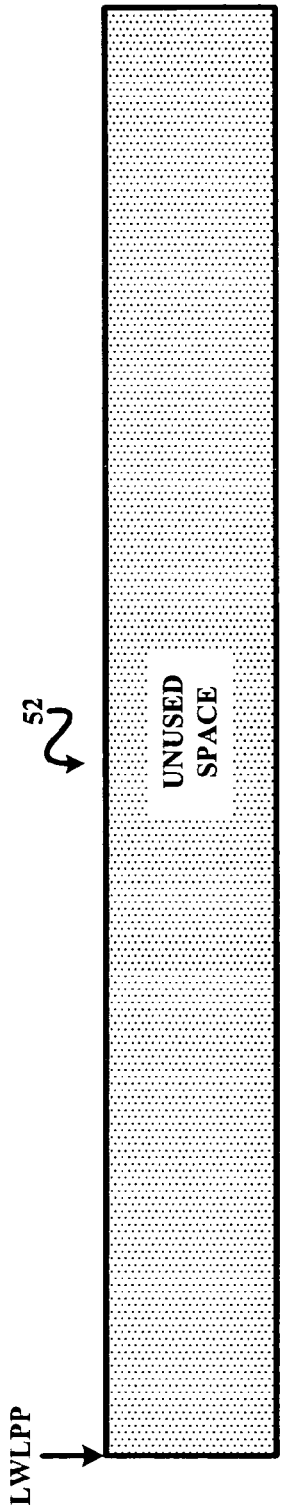
FIGS. 23-25 illustrate exemplary operational states of a database log buffer of a standby data processing system during an execution of the flowchart illustrated in FIG. 22.

Referring to FIGS. 4 and 22, flowchart 170 is representative of a standby-side log-shipping data replication of the present invention that is based on processing each buffer flush boundary indication received from an active system 40 in the form of a LWLP indication. A stage SI72 of flowchart 170 encompasses log receiving agent 51 initializing database log buffer 52 to store log data received from log shipping agent 45 and further setting the LWLPP buffer variable to a beginning of log value in database log buffer 52 (i.e., an initial position of unused space within database log buffer 52 reserved for the log data) as exemplarily shown in FIG. 23.

A stage S174 of flowchart 170 encompasses log receiving agent 51 receiving information from log shipping agent 45. The information received during stage S174 will either be log pages, or non-log information that may or may not include a LWLP indication. As such, a stage S176 of flowchart 170 encompasses log receiving agent 51 determining whether log pages were received during stage S176 and a stage S178 of flowchart 170 encompasses log receiving agent 51 determining whether a LWLP indication was found in non-log information if non-log information was received by log receiving agent 51 during stage S174.

If the information received by log receiving agent 51 during stage S174 is non-log information that does not include the LWLP indication, then log receiving agent 51 proceeds from stage S174 through stages S176 and S178 to a stage S180 to conventionally process the non-log information before returning to stage S174.

If the information received by log receiving agent 51 during stage S174 consists of log pages, then log receiving agent 51 proceeds from stage S174 through stage S176 to a stage S182 of flowchart 170 to save the log pages to database log buffer 52, and then to a stage SI 84 of flowchart 170 to determine whether a LWLP indication was found in the log data. If a LWLP indication was not found in the log data, then log receiving agent 51 returns to stage S174. If a LWLP indication was found in the log data, then log receiving agent 51 proceeds to a stage S188 of flowchart 170 to update the LWLPP buffer variable to the latest received LWLP value and then to a stage S190 of flowchart 170 to flush any previously unavailable received log pages up to the buffer position indicated by the. LWLPP buffer variable and make the log pages available to log replay agent 55. Thereafter, log receiving agent 51 returns to stage S174.

If the information received by log receiving agent 51 during stage S174 is non-log information that does include the LWLP indication, then log receiving agent 51 proceeds from stage S174 through stages S176 and S178 to a stage S186 of flowchart 180 to conventionally process the non-log information. Thereafter, before returning to stage S174, log receiving agent 51 proceeds to stage S188 to update the LWLPP buffer variable to the latest received LWLP value and then to stage S190 to flush any previously unavailable received log pages up to the buffer position indicated by the LWLPP buffer variable and make the log pages available to log replay agent 55.

Referring still to FIGS. 4 and 22, to facilitate a working understanding of flowchart 170, the determination stages S176, S178, and S184 will be described in the context log receiving agent 51 sequentially receiving a "Peer State" message (i.e., an exemplary non-log data message without a LWLP indication), a group of log pages without a LWLP indication, and a LWLP indication.

First, a reception of the Peer State message by log receiving agent 51 during an initial execution of stage S174 informs log receiving agent 51 that log shipping agent 45 will start transmitting new log pages to log receiving agent 51 concurrent to the flushing of the log pages from database log buffer 46 to database log disk 48 by log writer 47. In view of the fact that the Peer State message is non-log data, log receiving agent 51 will proceed from stage S174 through determination stages S176 and S178 to conventionally process the Peer State message during a stage S180 and then return to stage S174.

Figure 24:
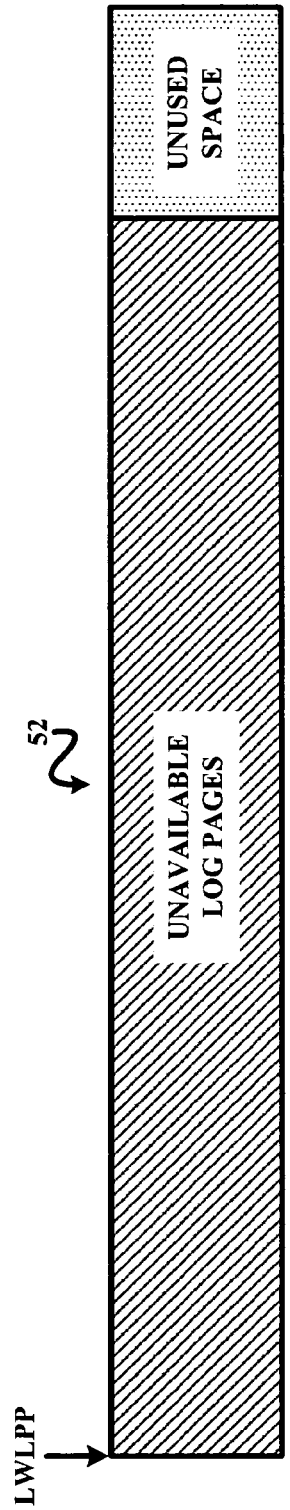

Second, a reception of the log pages without the LWLP indication by log receiving agent 51 during a second iteration of stage S174 triggers log receiving agent 51 to proceed to a stage S182 of flowchart 170 to save the log pages in database log buffer 52 as exemplarily illustrated in FIG. 24. In view of the fact that a LWLP indication is not within the log pages, log receiving agent 51 proceeds from stage S182 through stage S184 to return to stage S174.

Finally, a reception of the LWLP indication by log receiving agent 51 during a third iteration of stage S174 triggers log receiving agent 51 to proceed from stage S174 through determination stages S176 and S178 to a stage S186 of flowchart 170 whereby the LWLP indication is processed by log receiving agent 51. Upon reading the LWLP indication during stage S186, log receiving agent 51 proceeds to a stage S188 of flowchart 170 to update the LWLPP buffer variable to the LWLP indication as exemplarily illustrated in FIG. 25, whereby all the log pages up to a position within database log buffer 52 as indicated by updated the LWLPP buffer variable are available for flushing. Subsequently, the available log pages are flushed to database log disk 54 and made available to log replay agent 55 during stage S190 as further exemplarily illustrated in FIG. 25.

Figure 25:
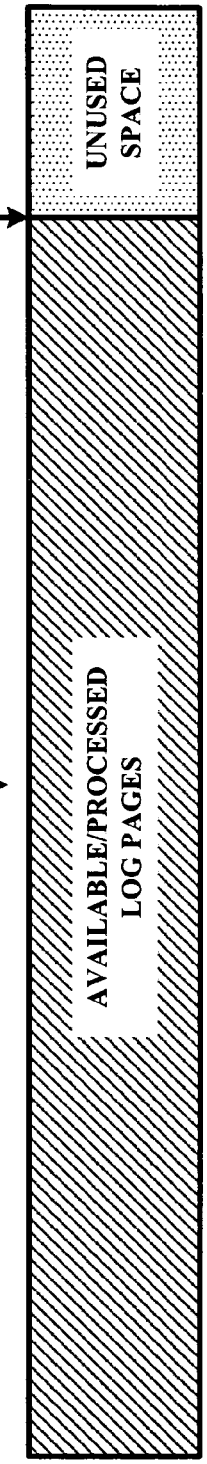

Referring to FIGS. 4 and 22, those having ordinary skill in the art will appreciate that an embedding of the LWLP indication in the log pages would trigger log receiving agent 51 to proceed from stage S174 through stages S176-S182-S184-S188 to stage S190, whereby log receiving agent 51 would update the LWLPP buffer variable to the LWLP indication as exemplarily illustrated in FIG. 25, and all the log pages up to a position within database log buffer 52 as indicated by the LWLPP buffer variable would be available for flushing and are flushed to database log disk 54 and made available to log replay agent 55 during stage S190 as exemplarily illustrated in FIG. 25.

Figure 26:
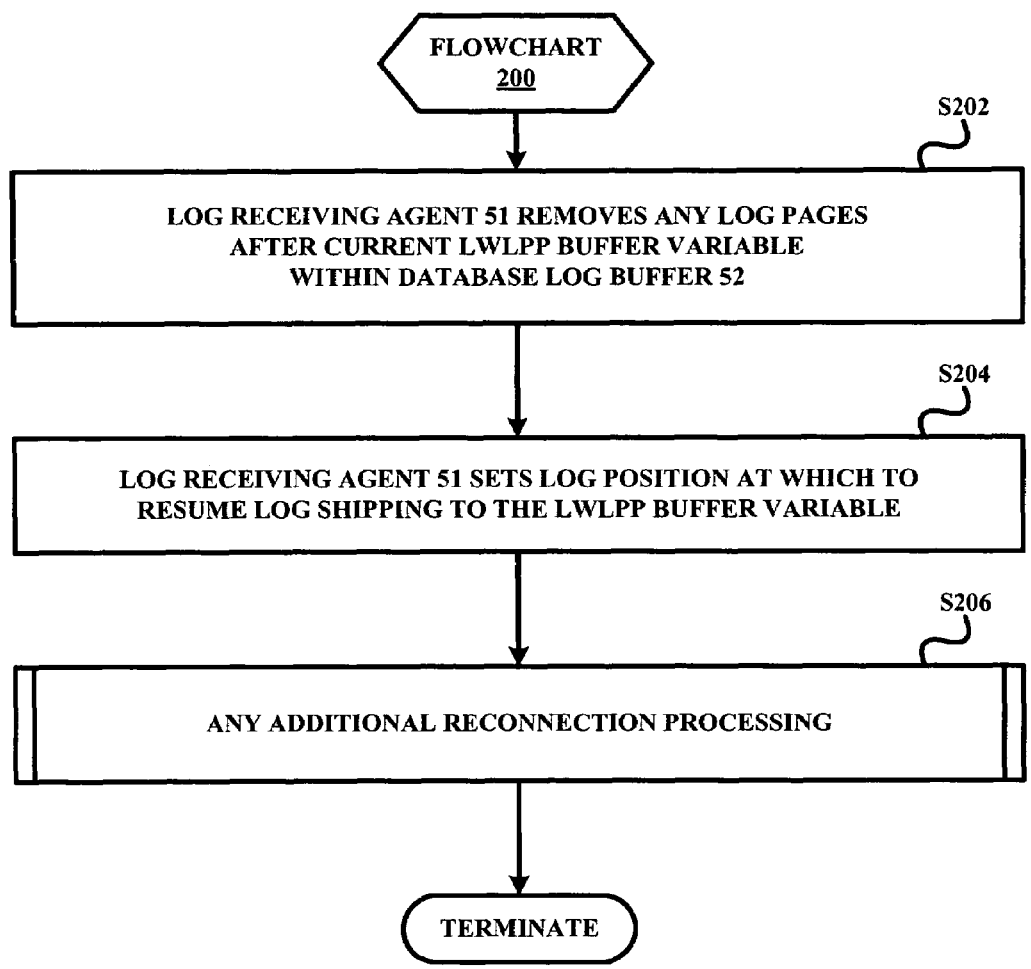
FIG. 26 illustrates a flowchart representative of one embodiment of a log-shipping data replication standby-side reconnection method in accordance with the present invention.

FIG. 26 illustrates a flowchart 200 representative of a log shipping data replication standby-side reconnection method of the present invention. Referring to FIGS. 4 and 26, flowchart 200 is implemented by system 50 whenever network communication channel 60 is lost and then restored, and system 40 is still operating in a primary role. A stage S202 of flowchart 200 encompasses log receiving agent 51 removing any log pages after the current LWLPP buffer variable within database log buffer 52. For example, if database log buffer 52 contained unavailable log pages after the current LWLPP buffer variable as shown in FIG. 15, then log receiving agent 51 would remove these unavailable log pages from database log buffer 52. Also by example, if database log buffer 52 contained unavailable log pages after the current LWLPP buffer variable as shown in FIG. 24, then log receiving agent 51 would remove these unavailable log pages from database log buffer 52.

Referring again to FIGS. 4 and 26, a stage S204 of flowchart 200 encompasses log receiving agent 51 setting the log position at which to resume log shipping to the LWLPP buffer variable, and a stage S206 of flowchart 200 encompasses any additional reconnection processing required by system 50 in order to reconnect to system 40.

Figure 27:
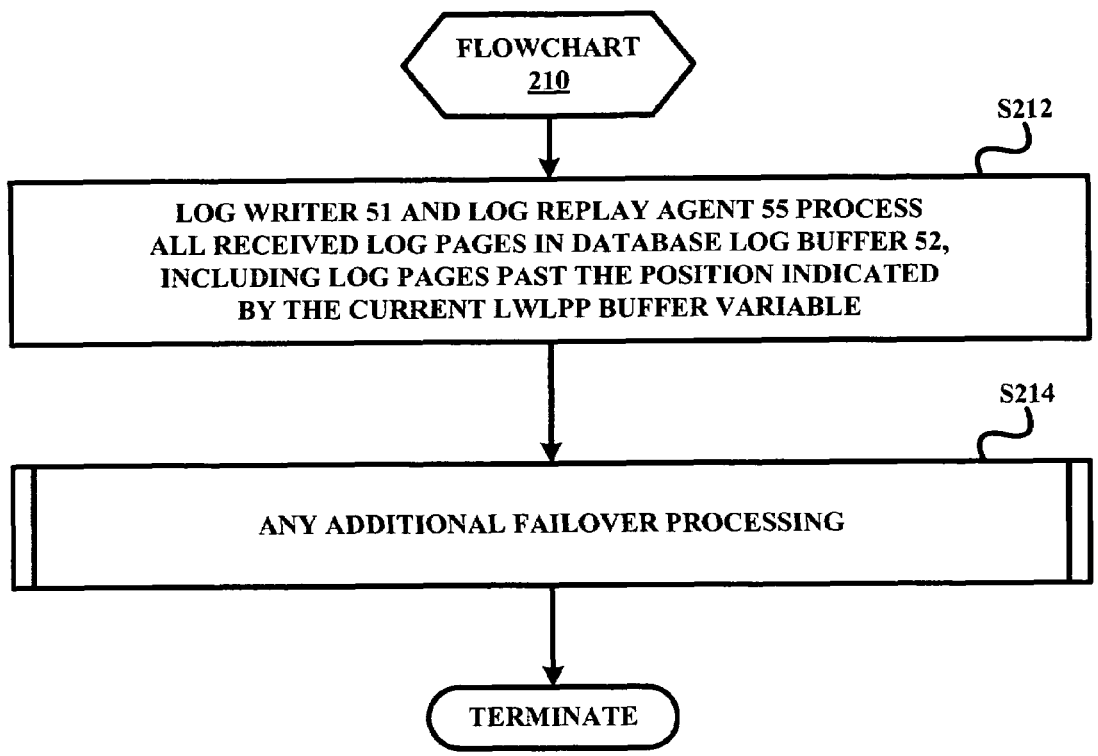
FIG. 27 illustrates a flowchart representative of one embodiment of a log-shipping data replication standby-side failover method in accordance with the present invention.

FIG. 27 illustrates a flowchart 2 10 representative of a log shipping data replication standby-side failover method of the present invention. Referring to FIGS. 4 and 27, flowchart 210 is implemented by system 50 whenever system 40 fails and system 50 transitions to a primary role. A stage S212 of flowchart 2 10 encompasses log writer 53 and log replay agent 55 processing all received log pages in database log buffer 52 including those log pages past the position indicated by the current LWLPP buffer variable. For example, if database log buffer 52 contained unavailable log pages after the current LWLPP buffer variable as shown in FIG. 15, then log writer 53 and log replay agent 55 would process these unavailable log pages in database log buffer 52. Also by example, if database log buffer 52 contained unavailable log pages after the current LWLPP buffer variable as shown in FIG. 24, then log writer 53 and log replay agent 55 would process these unavailable log pages in database log buffer 52.

Referring again to FIGS. 4 and 27, a stage S214 of flowchart 210 encompasses any additional failover processing required by system 50 in order for system 50 to assume the primary role.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

We claim:

1. A log-shipping data replication method, comprising:
embedding a Last in Flush (LIF) in a first log data and a Last Written Log Page LWLP in a heartbeat message, wherein the LIF and the LWFP indicate that the first log data is flushed from a database log buffer to a database log disk at the primary server;
concurrently flushing the first log data from the database log buffer to the database log disk at a primary server and transmitting the first log data from the primary server to a standby server coupled to the primary server;
transmitting the heartbeat message to the standby server;
receiving the first log data in a standby server database log buffer;
setting a Last Written Log Page Position (LWLPP) and a Last-In-Flush-Log-Position (LIFLP) to a start of the first log data in the standby server database log buffer;
finding the LIF in the first log data in the standby server database log buffer;
setting the LIFLP to the LIF in the standby server database log buffer;
receiving the heartbeat message at the standby server;
replaying the first log data indicated by the LWLLP and the LIFLP at the standby server database log buffer; and
flushing the first log data indicated by the LWLLP and the LIFLP to a standby server database disk.

2. The log-shipping data replication method of claim 1, wherein the first log data is formatted as at least one log page.

3. The log-shipping data replication method of claim 1, further comprising:
receiving the first log data at the standby server; and
deleting any unflushed portion of the received first log data at the standby server in response to the standby server being disconnected and then reconnected to the primary server without any accompanying change in a standby role of the standby server.

4. The log-shipping data replication method of claim 1, further comprising:
receiving the first log data at the standby server; and
flushing and replaying any unflushed portion of the received first log data at the standby server in response to a standby role of the standby server changing to a primary role.

5. A log-shipping data replication system, comprising:
a primary server;

a standby server connected to the primary server; and wherein the primary server includes
> means for embedding a LIF in a first log data and a Last Written Log Page(LWLP) in a heartbeat message, wherein the LIF and the LWFP indicates that the first log data is flushed from a database log buffer to a database log disk at the primary server;
> means for concurrently flushing the first log data from the database log buffer to the database log disk at a primary server and transmitting the first log data from the primary server to the standby server coupled;
> means for transmitting the heartbeat message to the standby server;
> wherein the standby server includes means for
> receiving the first log data in a standby server database log buffer;
> setting a LWLPP and a LIFLP to a start of the first log data in the standby server database log buffer;
> finding the LIF in the first log data in the standby server database log buffer;
> setting the LIFLP to the LIF in the standby server database log buffer;
> receiving the heartbeat message at the standby server;
> replaying the first log data indicated by the LWLLP and the LIFLP at the standby server database log buffer if the LWFP is embedded in the heartbeat message; and
> flushing the first log data indicated by the LWLLP and the LIFLP to a standby server database disk if the LWFP is embedded in the heartbeat message.

6. The log-shipping data replication system of claim 5, wherein the standby server comprises means for deleting any unflushed portion of the log data at the standby server in response to the standby server receiving the log data and subsequently being disconnected and then reconnected to the primary server without any accompanying change in a standby role of the standby server.

7. The log-shipping data replication system of claim 5, wherein the standby server comprises means for flushing and replaying any unflushed portion of the log data at the standby server in response to the standby server receiving the log data and subsequently changing from a standby role to a primary role.

8. The log-shipping data replication method of claim 1, wherein embedding the LIF in a first log data comprises setting a bit in a header within the first log data.

9. The log-shipping data replication method of claim 1, wherein the first log data is formatted as at least one log page, and wherein the at least one log page includes a sequential series of fixed size log data portions, including a first log page and a last log page, and further comprising:
> marking the first log page with a first-in-flush indication indicative of a starting boundary of the first log data; and
> marking the last log page with the LIF indicative of an ending boundary of the first log data.

* * * * *